Aug. 22, 1950 — G. GOODHAND — 2,519,753
PHOTOGRAPHIC CASSETTE
Filed March 20, 1946

INVENTOR.
Glenn Goodhand
BY Charles Shepard
his Attorney

Patented Aug. 22, 1950

2,519,753

UNITED STATES PATENT OFFICE 2,519,753

PHOTOGRAPHIC CASSETTE

Glenn Goodhand, Pittsford, N. Y., assignor, by mesne assignments, to Bell & Howell Company, Chicago, Ill., a corporation of Illinois Application March 20, 1946, Serial No. 655,848

6 Claims. (Cl. 242—71)

This invention relates to film cassettes of the kind adapted to hold a roll of sensitive photographic film to be paid out therefrom through a slot in the side of the cassette.

The object of this invention is to provide a cassette of this kind which is simple in construction, light-tight, and in which the caps enclosing the ends of the body are held thereon by interengaging means.

More specifically the object of the invention is to provide a cassette of this kind having a body which may be but need not necessarily be of resilient material, and end caps removable from the body and held thereto by holding means acting independently of the resiliency of the body.

These and other desirable objects are accomplished by the constructions disclosed as illustrative embodiments of the invention in the following description and in the accompanying drawings forming a part hereof, in which.

Figure 3:
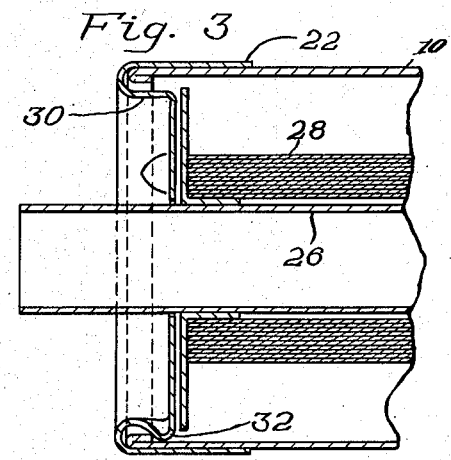
Fig. 3 is an enlarged sectional view taken longitudinally through a portion of the cassette, substantially on the line 3—3 of Fig. 2.
Figure 7:
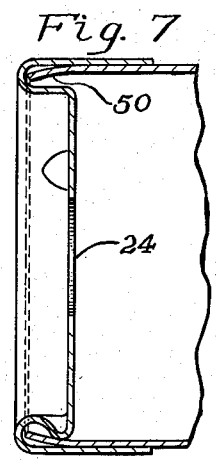
Figure 5:
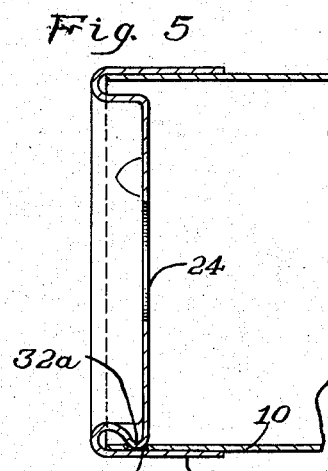
Figure 4:
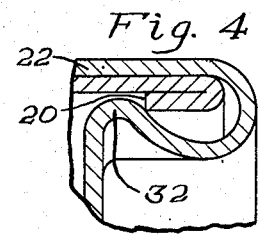
Fig. 4 is an enlarged fragmentary section illustrating details of the means for retaining the caps on the body.
Figure 6:
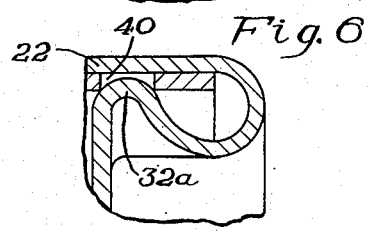
Figure 8:
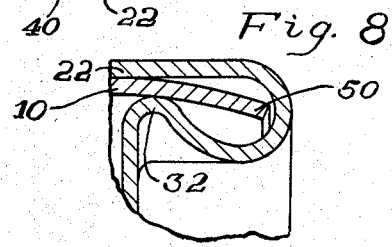

Figs. 5 and 6 are sections similar to Figs. 3 and 4, respectively, illustrating a modified construction for retaining the caps on the body; and Figs. 7 and 8 are sections similar to Figs. 3 and 4 and illustrate another alternative construction.

The same reference numerals throughout the several views indicate the same parts.

The embodiment of the invention illustrated in the drawings comprises a cassette having a body 10 conveniently formed of resilient sheet metal wrapped into a generally cylindrical shape with its free edges separated from each other to form an entrance and exit slot for the photographic film, and caps 12 and 14 arranged on its ends. The edges of the slot may be provided with lips 16 for guiding the film, and which may be lined with plush 18 or similar material for sealing the slot to prevent the entry of light therethrough.

Figure 1:
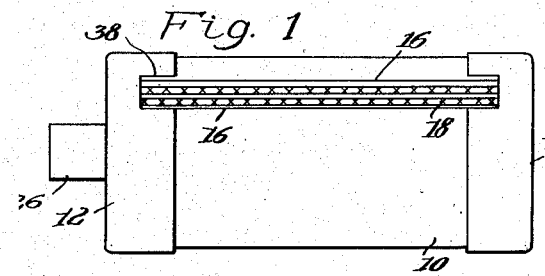
Fig. 1 is a side elevation of a film cassette constructed according to one possible embodiment of the invention.
Figure 2:
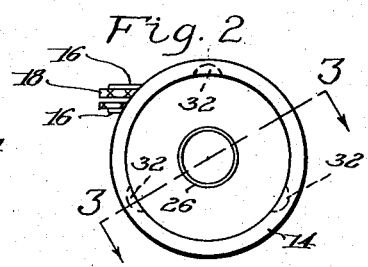
Fig. 2 is an end elevation of the same.

The present invention relates particularly to the end caps and to the manner in which they are held onto the generally cylindrical body. Referring particularly to that form of the invention illustrated in Figs. 1 to 4 of the drawings, circular shoulders or keepers 20 are formed within the ends of the body by bending the material thereof inwardly upon itself, as shown. Each of the caps 12 and 14 has an outer flange 22 arranged to slide over the outer side of the end of the generally cylindrical body, to form a light-tight contact therewith and, if the body sheet is of resilient material tending to expand outwardly, to retain it in substantially cylindrical form. Each of said caps has a central opening 24 through which extends the hub of the film spool 26 carrying the roll of film 28 within the cassette. Each of the caps has its rim bent inwardly over the end of the body, as seen at 30 in Fig. 3 of the drawings, so that the central portion thereof is depressed or seated within the end of the body, and imparts to the cap a cup-shape of which the part 30 forms the side or rim concentric with but spaced inwardly from the inner surface of the body. At a plurality of points around the circumference of the rim 30, latch portions or detent portions 32 are pressed radially outwardly from the material of the rim portion 30 of the cap, and are adapted to snap resiliently over the shoulder 20 on the body when the cap is placed on the end of the body. Three of the detents 32 are illustrated in the drawings; however, it will be understood that a greater or lesser number may be employed without departing from the scope of the invention. Referring to Fig. 1, it will be noted that notches 38 are cut from the peripheral flanges 22 of the caps to provide a clearance for the lips 16 on the body.

In this form of the invention just described, it will be noted that except where the detent portions 32 occur, the cap flanges 22 and 30 are radially separated from each other by a distance greater than the thickness of the thickened edge of the body member, that is, the combined thickness of the body sheet 10 and of the folded-over part 20. The radial separation of the cap flange 22 from the bumped-out detent portions 32, however, is less than the combined thickness of the parts 10 and 20, but greater than the thickness of the sheet 10 alone. It will be noted also that the resilience, if any, of the body sheet 10 is not a factor in retaining the cap in place on the body, and the body does not have to be sprung or deformed when removing or replacing the cap. The resilience of the cap itself is, however, a factor, and the cap must be made of sheet material (preferably metal) sufficiently resilient so that the latch or detent portions 32 may spring resiliently inwardly toward the center of the cap, in order to pass over the shoulder 20 when the cap is being placed on the body or removed therefrom. The shoulder 20 thus constitutes abutment means cooperating with the detent portion 32 to maintain the cap resiliently in place.

Referring now to the alternative form of the invention illustrated in Figs. 5 and 6 of the drawings, the shoulder on the body for cooperation with the latch or detent portion on the cap is here formed not from a supplemental thickness 20, but from the thickness of the body sheet 10 itself, by forming openings or holes 40 in the body sheet and using the outer edges of the holes 40 as the shoulders for retaining the detent portions 32a of the cap. As in the previous embodiment, a plurality of such detent portions are formed on the cap, spaced at appropriate intervals circumferentially around each cap, and a corresponding plurality of holes are formed in the body sheet 10, three holes and three detent portions being convenient. The marginal flange 22 on each cap overlaps the body sheet 10 for a considerable distance beyond the holes 40 and thus prevents leakage of light through the holes. When placing the cap on the body, the notch 38 in the flange 22 must, of course, be alined with the lips 16 on the body, and this alinement serves to orient the cap in a rotary direction so that the detent portions 32a are alined with the openings 40 and will enter these openings when the cap is thrust home on the body. The detent portions 32a must obviously extend closer to the outer flange 22 than is the case in the previous embodiment, and must be spaced from the flange 22 (in a radial direction) by a distance less than the thickness of the body sheet 10. In this embodiment, as in the previous one, it is seen that the resilience, if any, of the body sheet 10 is not a factor in removing or replacing the cap or in maintaining it in place.

In the other alternative embodiment illustrated in Figs. 7 and 8, the cap may be identical with the cap of Figs. 3 and 4, and may have a plurality of detent portions 32 formed thereon, as before. The shoulder on the body sheet 10 for cooperation with the detent portions of the cap is, in this instance, not an abrupt shoulder, but merely a gradual inward inclination of the marginal edge of the body sheet 10, as indicated at 50. In other words, the marginal edge of the body sheet, at each end of the cassette, is slightly deformed inwardly as shown, to a somewhat conical shape. The detent portions 32 on the cap wedge against the inclined inner surface of the portion 50 of the body sheet, preventing withdrawal of the cap from the body sheet except by the exertion of the necessary force to overcome the resistance. In this embodiment of Figs. 7 and 8, the resilience, if any, of the body sheet 10 may or may not be factor in retaining the cap in place, depending upon the relative stiffness of the body sheet material and of the cap material. If the body sheet 10 is quite rigid and if the cap is made of material which is quite resilient and easily deflected, it is apparent that withdrawal of the cap from the body sheet will be accomplished, not by deflection of the constricted portion 50 of the body sheet, but by radially inward deflection of the portion 32 of the cap. On the other hand, if the cap is of quite rigid material and the body sheet quite resilient and flexible, then removal of the cap will cause a radially outward springing or deflection of the portion 50 of the body, without appreciable inward springing or deflection of the portion 32 of the cap. If both the body and the cap are resilient, there may be, of course, some outward springing of the portion 50 of the body sheet and some inward springing of the portion 32 of the cap, during a removal operation. Corresponding action will occur when the cap is placed on the body.

It is seen from the foregoing disclosure that constructions are provided which admirably fulfill the above-mentioned objects of the invention. It is to be understood that the foregoing disclosure is given by way of illustrative example only, rather than by way of limitation, and that without departing from the invention the constructions may be varied within the scope of the appended claims.

What is claimed is:

1. A photographic film cassette comprising a body of approximately cylindrical shape open at one end, said end having abutment means accessible from the interior of said body, and a cap placeable on and removable from said end of said body, said cap having a first flange substantially encircling the exterior of said body, a second flange connected to the first flange and lying on the interior of said body when said cap is in place on said body, and detent means formed on said second flange for engaging said abutment means on said body to tend to hold said cap in place on said body.

2. A photographic film cassette comprising a body open at one end, said end having abutment means accessible from the interior of said body, and a cap placeable on and removable from said end of said body, said cap having a first flange adapted to encircle the exterior of said body in light-tight engagement therewith when said cap is in place on said body and a second flange connected to said first flange and spaced radially inwardly therefrom so that the edge of said body is received between said first flange and said second flange when the cap is in place on the body, said second flange having a plurality of protuberances formed thereon and projecting radially outwardly toward said first flange and serving to engage said abutment means on said body to resist withdrawal of said cap from said body.

3. A construction as described in claim 1, in which said abutment means on said body is formed by the material of said body being folded inwardly over on itself to form a shoulder extending circumferentially around the interior of said body adjacent the edge of said open end.

4. A construction as described in claim 1, in which said abutment means on said body is formed by the edge of a hole formed through said body adjacent said open end, and in which said detent means on said cap extends partly into said hole.

5. A construction as described in claim 1, in which said abutment means on said body is formed by an inwardly sloped surface at the edge of said body adjacent said open end.

6. A construction as described in claim 2, in which said abutment means on said body is formed by a thickened edge on said body adjacent said open end, and in which the radial spacing between said first flange and said second flange of said cap is greater than the thickness of said thickened edge throughout the major part of the circumference of said cap and is reduced to a spacing less than the thickness of said edge at a plurality of points spaced circumferentially around said cap, to form said protuberances.

GLENN GOODHAND.

REFERENCES CITED

The following references are of record in the file of this patent:

UNITED STATES PATENTS

| Number | Name | Date |
|---|---|---|
| 1,747,931 | Debrie | Feb. 18, 1930 |
| 2,019,672 | Goodhand | Nov. 5, 1935 |

FOREIGN PATENTS

| Number | Country | Date |
|---|---|---|
| 459,967 | Great Britain | Jan. 19, 1937 |